US011497989B2

(12) United States Patent
Umeki et al.

(10) Patent No.: US 11,497,989 B2
(45) Date of Patent: Nov. 15, 2022

(54) INFORMATION PROCESSING APPARATUS AND SOFTWARE PROCESSING METHOD

(71) Applicant: Sony Interactive Entertainment Inc., Tokyo (JP)

(72) Inventors: Tsubasa Umeki, Saitama (JP); Shuichi Takeda, Tokyo (JP); Yoshinori Kotsugai, Tokyo (JP); Yasuyuki Hiramaru, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 99 days.

(21) Appl. No.: 16/482,461

(22) PCT Filed: Feb. 28, 2017

(86) PCT No.: PCT/JP2017/007945
§ 371 (c)(1),
(2) Date: Jul. 31, 2019

(87) PCT Pub. No.: WO2018/158847
PCT Pub. Date: Sep. 7, 2018

(65) Prior Publication Data
US 2020/0246694 A1 Aug. 6, 2020

(51) Int. Cl.
A63F 13/31 (2014.01)
A63F 13/213 (2014.01)
A63F 13/34 (2014.01)

(52) U.S. Cl.
CPC ............ A63F 13/31 (2014.09); A63F 13/213 (2014.09); A63F 13/34 (2014.09)

(58) Field of Classification Search
CPC ......... A63F 13/31; A63F 13/213; A63F 13/34
(Continued)

(56) References Cited

U.S. PATENT DOCUMENTS 6,978,933 B2    12/2005  Yap
7,878,905 B2 *   2/2011  Weston ................. A63F 13/825
                                                    463/39
(Continued)

FOREIGN PATENT DOCUMENTS

EP        1726344 A1    11/2006
JP     2004508783 A      3/2004
(Continued)

OTHER PUBLICATIONS

International Preliminary Report on Patentability and Written Opinion for corresponding PCT Application No. PCT/JP2017/007945, 21 pages, dated Sep. 3, 2019.
(Continued)

Primary Examiner — Jay Trent Liddle
Assistant Examiner — Ryan Hsu
(74) Attorney, Agent, or Firm — Matthew B. Dernier, Esq.

(57) ABSTRACT

An information acquiring section acquires identification information recorded in a card. A behavior DB stores a kind-of-card ID, and software associated with the kind-of-card ID. A processing section, when the identification information is acquired by the information acquiring section, specifies software associated with a kind of card by referring to storage contents of the behavior DB. Incidentally, the behavior DB stores the kind-of-card ID and processing for software with the kind-of-card ID and the processing being associated with each other. The processing section executes the processing stored in the behavior DB for the specified software.

10 Claims, 7 Drawing Sheets

(58) Field of Classification Search
USPC .......................................................... 463/42
See application file for complete search history.

(56) References Cited

U.S. PATENT DOCUMENTS

| | | | |
|---|---|---|---|
| 10,010,789 B2 | 7/2018 | Koizumi | |
| 10,515,516 B1* | 12/2019 | Eckman | ............... G07F 17/3276 |
| 2003/0191713 A1 | 10/2003 | Yap | |
| 2005/0240676 A1* | 10/2005 | Moon | ................ H04N 21/4627 |
| | | | 709/231 |
| 2006/0040741 A1* | 2/2006 | Griswold | ............ G07F 17/3239 |
| | | | 463/40 |
| 2014/0148094 A1* | 5/2014 | Park | .......................... H04B 5/00 |
| | | | 455/41.1 |
| 2015/0290545 A1* | 10/2015 | Barney | ................... A63F 13/00 |
| | | | 463/32 |
| 2016/0093154 A1* | 3/2016 | Bytnar | ................ G07F 17/3237 |
| | | | 463/25 |
| 2017/0061733 A1* | 3/2017 | Gulla | ....................... A63F 13/69 |
| 2017/0072304 A1 | 3/2017 | Koizumi | |

FOREIGN PATENT DOCUMENTS

| | | |
|---|---|---|
| JP | 2005056150 A | 3/2005 |
| JP | 2007318464 A | 12/2007 |
| JP | 2010057053 A | 3/2010 |
| JP | 2017004523 A | 1/2017 |
| WO | 2006111782 A1 | 10/2006 |

OTHER PUBLICATIONS

International Search Report for corresponding PCT Application No. PCT/JP2017/007945,4 pages, dated May 30, 2017.
Extended European Search Report for corresponding EP Application No. 17899007.3, 10 pages, dated Oct. 15, 2020.

* cited by examiner

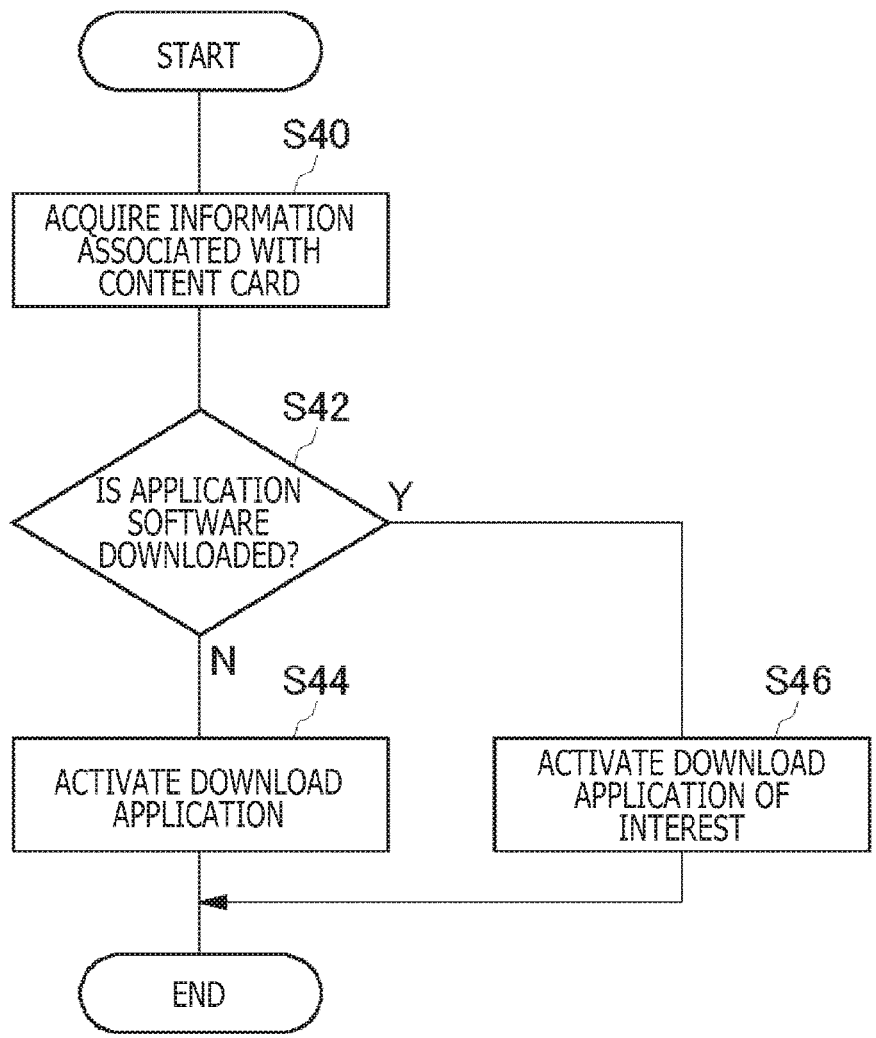

INFORMATION PROCESSING APPARATUS AND SOFTWARE PROCESSING METHOD

TECHNICAL FIELD

The present invention relates to a technology for processing software by using information recorded in a recording medium such as a card.

BACKGROUND ART

A game machine includes a user interface, such as a manipulation button and a cursor key, which is basically specialized in a game manipulation. The recent game machine has been able to implement various applications in addition to games. For the purpose of causing an input manipulation to the application to be easy, a keyboard, a mouse or the like can be connected to a stationary game machine in an external style.

SUMMARY

Technical Problem

On the other hand, since a portable game machine is used out of doors in some cases, the portable game machine is hard to utilize an external user interface. For this reason, a child has a tendency to feel the trouble for a manipulation other than the game. In addition, it takes a lot of time for not only the child, but also a man or a woman to perform an inexperienced manipulation. This is a problem common to not only the portable game machines, but also other kinds of terminal apparatuses. Therefore, it is preferable to provide a user interface which can be more simply, intuitively utilized.

The present invention has been made in the light of such a problem, and it is therefore desirable to provide a technology relating to a user interface which a user can intuitively utilize.

Solution to Problem

In order to solve the problem described above, an information processing apparatus according to a certain aspect of the present invention is provided with an information acquiring section acquiring identification information recorded in a recording medium, a storage section storing the identification information and software associated with the identification information, and a processing section, when the identification information is acquired by the information acquiring section, specifying the software associated with the identification information by referring to storage contents in the storage section.

Another aspect of the present invention is a software processing method. The software processing method is provided with a step of acquiring identification information recorded in a recording medium, and a step of specifying the software associated with the acquired identification information by referring to storage contents in a storage section storing the identification information, and the software associated with the identification information.

It should be noted that an arbitrary combination between the above constituent elements, and matters obtained by transforming an expression of the present invention into a method, an apparatus, a system, a computer program, a recording medium in which a computer program is readably recorded, a data structure, and the like are also valid as aspects of the present invention.

BRIEF DESCRIPTION OF DRAWINGS

FIG. 7 is a flow chart depicting an example of processing in the information processing apparatus.

DESCRIPTION OF EMBODIMENTS

Figure 1:
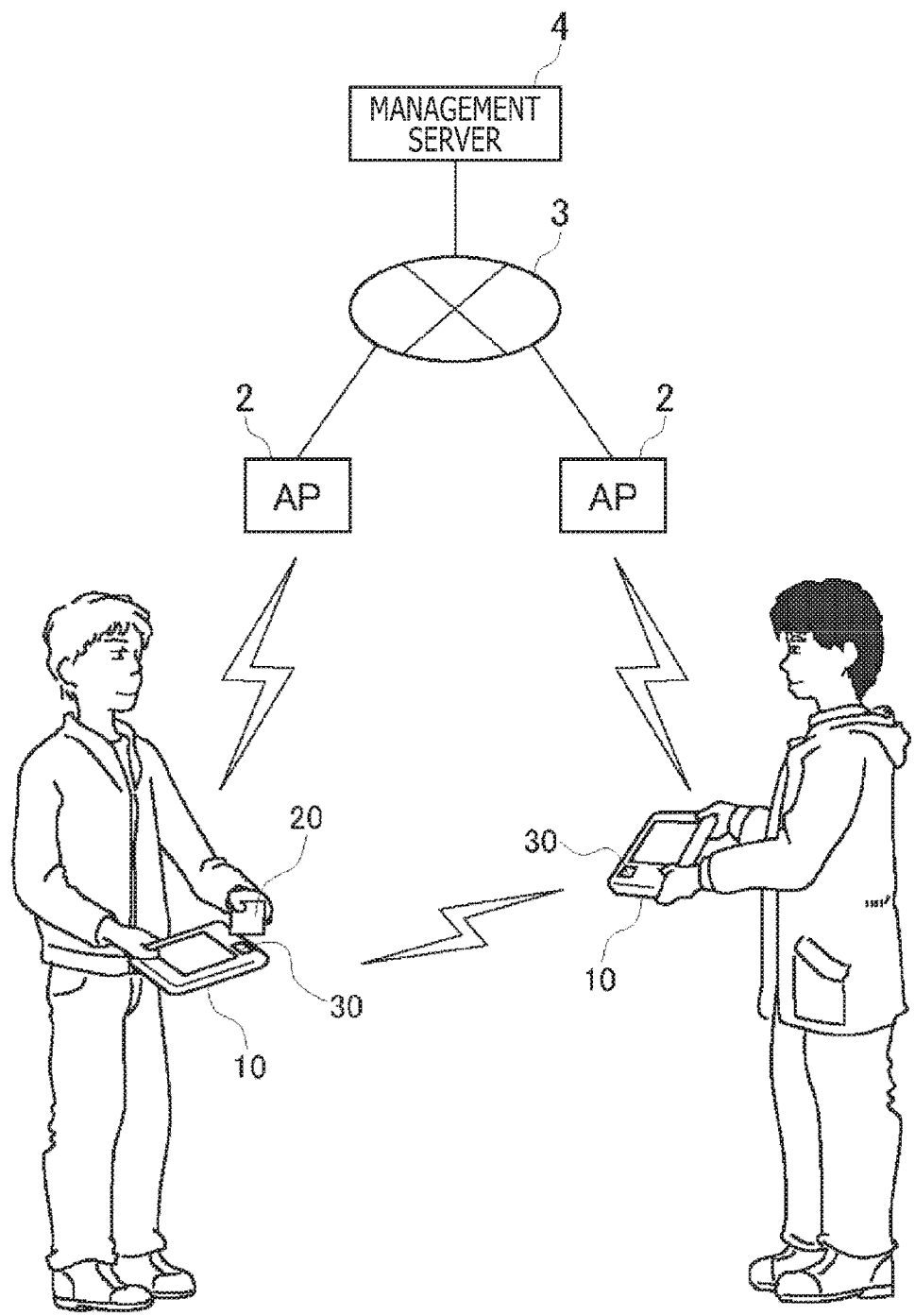
FIG. 1 is a view depicting an information system in an embodiment.

FIG. 1 depicts an information processing system 1 in an embodiment. The information processing system 1 is provided with an information processing apparatus 10 which a user manipulates, and a management server 4 which manages information associated with the user and content. The user has his/her user account, and the management server 4 distinguishes the user in the information processing system 1 on the basis of the user account. The management server 4 holds profile information of the user such as a name, a profile photograph, an avatar, and self-introduction so as for the profile information to be associated with the user account.

The information processing apparatus 10 is connected to a network 3 such as the Internet via an access point (AP) 2, and transmits/receives data to/from the management server 4. Although a plurality of information processing apparatuses 10 can communicate with one another through the network 3, the plurality of information processing apparatuses 10 may mutually directly communicate with one another through a wireless ad hoc network. Although in the embodiment, the information processing apparatus 10 is a portable game machine, the information processing apparatus 10 may be a portable terminal apparatus, other than the game machine, such as a smartphone or a tablet. In addition, the information processing apparatus 10 may not be only the portable terminal apparatus, but also may be a stationary terminal apparatus.

With the information processing system 1, the user can perform manipulation input to the information processing apparatus 10 by using a recording medium in which predetermined information is recorded. The recording medium may have a tabular shape, or may have a three-dimensional shape. Although in the embodiment, a description will be given with respect to the case where a thin rectangular card 20 is utilized as a tabular recording medium, a card having any of other shapes such as a triangle and a circle may be valid. In addition, the tabular recording medium may have a form of a medal, a coin or the like. The tabular recording medium is preferably formed in a thin type one which has a size easy for the user to carry, and easy to stack on top of each other. It should be noted that the recording medium may be incorporated in a figure, a stuffed toy or the like, so that the recording medium may be sterically constructed as a whole.

The information processing apparatus 10 is provided with an information reading/writing section 30 for reading out the information recorded in the card 20 as the recording medium, or writing the information to the card 20. When the user holds the card 20 up the information reading/writing section 30, the information processing apparatus 10 executes the processing responding to the card 20.

Various kinds of cards 20 are prepared for the information processing system 1, and a user application is set every card 20. When consideration is given to the comprehensibility of the use application, the number of the use application of one sheet of card may be limited to one. Moreover, if consideration is given to that the number of sheets of cards which the user has is prevented from becoming too large, then, a plurality of use applications may be set to one sheet of card 20. It is preferable that characters or an illustration which expresses a use application is printed on the front surface of the card 20 and the user can recognize the use application of the card 20 from the characters or illustration.

At least a serial number (card user identifier (UID)) as a unique medium number, and kind-of-card identification information (kind-of-card ID) specifying a kind of card are recorded in the card 20. Data (dedicated data) peculiar to the card may be further recorded in the card 20. The dedicated data is recorded in order to be provided for software such as application software or system software. In the embodiment, specific functions in the application software or the system software are collectively referred to as "software" in some cases.

The card 20 in the embodiment is a recording medium from/to which information is read/written by a near field communication (NFC) technology. The card 20 may be used in an aspect in which new data write is made improper in terms of a read only card. The information reading/writing section 30 is an NFC reader/writer, and when the card 20 is held up by the user, the information reading/writing section 30 reads out the information recorded in the card 20. It should be noted that as a matter obviously, the card 20 may be used in a data writable form. In this case, the information reading/writing section 30 can record the information in the card 20. It should be noted that in the embodiment, the NFC reader/writer, of another terminal apparatus, other than the information reading/writing section 30 may record the information in the card 20.

The information processing apparatus 10 shows a behavior associated with the kind-of-card ID of the card 20. The information processing apparatus 10 may specify the software capable of responding to the acquired kind-of-card ID, and, for example, may actuate the software of interest. In addition, the information processing apparatus 10 may provide the card UID and/or the dedicated data recorded in the card 20 for the software of interest. At this time, the software reflects the card UID and/or the dedicated data thus provided in the processing thereof, and provides the reflected picture or sound for the user. From the point of view of the user, he/she can perform the manipulation input by only holding the card 20 up the information reading/writing section 30 without manipulating the manipulation button or the like of the information processing apparatus 10, and thus the simple and intuitive user interface can be realized.

In the embodiment, it is supposed that the card 20 is sold in a store such as a game shop. Obviously, the card 20 may also be sold in a virtual store of the Internet. In this case, the card which is sold by the user comes to the user's hand by the mail or the like. Hereinafter, concrete examples of kinds of cards will be simply described.

"Friend Card"

Each of the users possesses his/her friend card for exchanging with other user, and the friend cards are cards which are exchanged between the users. The friend card is something like a so-called business card. The friend cards are exchanged between the users, and the information reading/writing section 30 of the respective information processing apparatuses 10 are caused to read out the information associated with the friend card of the party, so that the users are registered mutually as the friends in the information processing apparatuses 10. Complicated procedures are necessary for performing the friend registration with the current game machine. According to the embodiment, however, the friend registration can be performed by performing a simple manipulation for exchanging the friend cards with each other to cause the information reading/writing section 30 to read out the information associated with the friend cards.

In addition, after the friend card is utilized in the friend registration, the friend card of interest is also utilized in order to invite the user of the friend card of interest to the application being executed by oneself. In a word, the friend card handed over from another user can be utilized in a use application for performing the friend registration, and a use application for calling the registered friend. During play of the game, the user can invite the friend to the game being played by only holding the friend card of the friend of interest up the information reading/writing section 30 of the user.

"Content Card"

A content card is a card for downloading or activating the application software as the content. Before the download, the user causes the information reading/writing section 30 to read out the information associated with the content card, whereby the application software associated with the content card of interest is downloaded from the management section 4 to be automatically installed. In addition, after the installation, the user causes the information reading/writing section 30 to read out the information associated with the content card, so that the application software associated with the content card of interest is activated.

"Uniform Resource Locator (URL) Calling Card"

A URL calling card is a card for activating browser application software (hereinafter, simply referred to as "browser" as well), and automatically accessing a predetermined URL. The URL is recorded as dedicated data within the card. The user causes the information reading/writing section 30 to read out the information associated with the URL calling card, thereby enabling a desired browser picture to be simply displayed on a display apparatus of the information processing apparatus 10. With the current terminal apparatus, the user activates the browser, manually inputs the URL, or selects a book mark, thereby displaying a desired browser picture. However, if the URL calling card is used, then, the user can see the desired browser picture by only holding the URL calling card up the information reading/writing section 30.

"Function Setting Card"

A function setting card is a card for setting a function in the information processing apparatus 10. The function setting card is used to cause setting processing responding to the card to be executed by acting on a specific function (module) of the system software. As an example, there is a card for limiting the utilization of the information processing apparatus 10 by a child by a parent. In the case where with the current game machine, the parent desires to prohibit the game play by the child, a plurality of links is followed from a home picture of the system, and a play prohibition picture in parental setting is displayed, thereby performing the setting of the prohibition of the game play by the child. On the other hand, in the embodiment, when the parent holds a function setting card called a "red card" up the information reading/writing section 30, the information processing apparatus 10 can prohibit the game play by the child at that time point. It is easy for both the parent and the child to understand that the game play is prohibited by an action of holding up the red card. In addition, there also may be a "yellow card" such that when the yellow card is held up the information reading/writing section 30 twice, the game play is prohibited. The effective use of these cards by the parent expects that the number of communications between the parent and the child is increased.

"Wallet Card"

A wallet card is a card for, for example, purchasing a game, an additional item, or the like. In a smartphone or the like in recent years, credit settlement has been generally utilized on-line. However, by utilization of the child having low recognition for the billing, the case where the billing amount becomes high has become frequently a problem. Since with the wallet card, the purchase is made by paying the cash in the store, the risk of generation of the high billing can be removed. For example, in the case where the child desires to purchase an item, the information processing apparatus 10 may not permit the credit settlement, but may admit the item purchase by only the wallet card.

"Front Configuration of Information Processing Apparatus"

Figure 2:
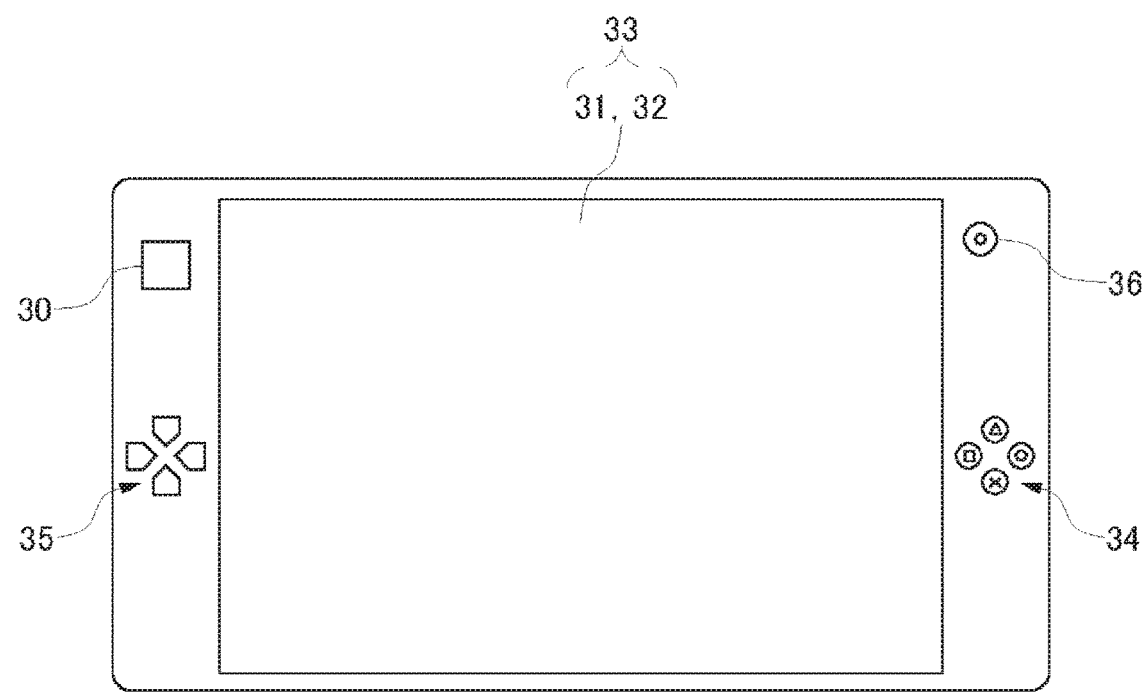
FIG. 2 is a view depicting the front of an information processing apparatus.

FIG. 2 depicts a front surface of the information processing apparatus 10. The front surface of the information processing apparatus 10 is provided with a rectangular touch panel 33. The rectangular touch panel 33 includes a display apparatus 31 and a transparent touch pad 32 which covers the surface of the display apparatus 31. The display apparatus 31 is a liquid crystal panel or an organic electroluminescence (EL) panel, and displays thereon an image. The touch pad 32 is a multi-touch pad having a function of detecting multiple points which are simultaneously touched. The touch panel 33 is configured as a multi-touch screen.

A triangle button, a circle button, a cross button, and a square button which are respectively located at diamond vertices (hereinafter, in the case where these buttons are generally named, they are referred to as a "manipulation button 34") are provided on the right side of the touch panel 33. An up key, a left key, a button key, and a right key (hereinafter, in the case where these keys are generally named, they are referred to as a "cursor key 35") are provided on the left side of the touch panel 33. A camera 36 is provided on the upper side of the manipulation button 34. In addition, the information reading/writing section 30 as the NFC reader/writer is provided on the upper side of the cursor key 35. It should be noted that the arrangement of the information reading/writing section 30, the manipulation button 34, the cursor key 35, and the camera 36 is an example, and they may be provided in the different positions.

"Internal Configuration of Information Processing Apparatus"

Figure 3:
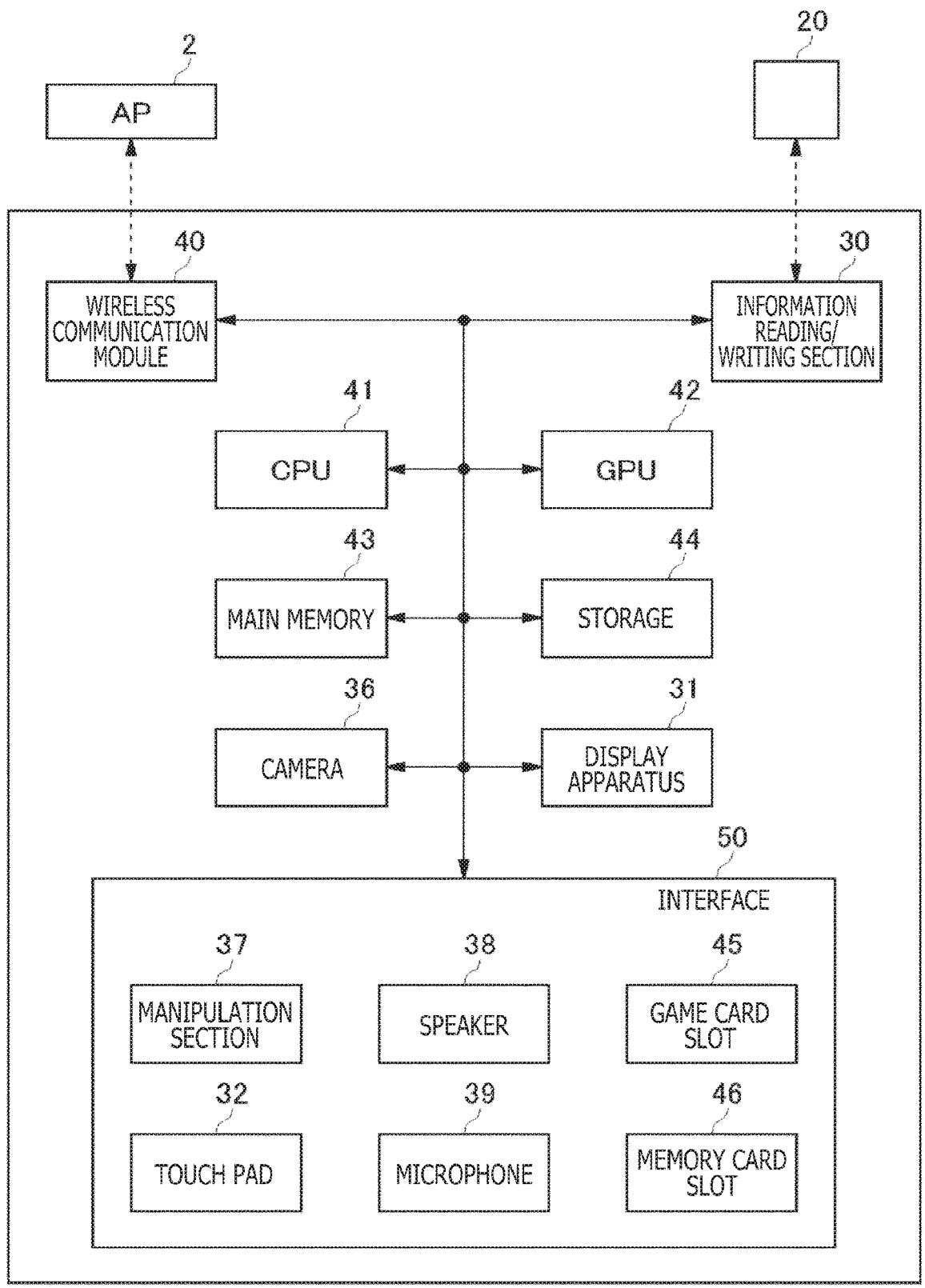
FIG. 3 is a functional block diagram of the information processing apparatus.

FIG. 3 depicts a functional block of the information processing apparatus 10. Constituent elements in the information processing apparatus 10 are connected to one another through a bus. A wireless communication module 40 includes a wireless local area network (LAN) module complying with a communication standard such as Institute of Electrical and Electronics Engineers (IEEE)802.11b/g, and is connected to the external network 3 through the AP 2. It should be noted that the wireless communication module 40 may have a communication function of the Bluetooth (registered trademark) protocol, or may be connected to a portable telephone network in response to the digital portable telephone network. The wireless communication module 40 has a communication function in the ad hoc mode, and can directly communicate with another information processing apparatus 10 located in the circumference.

A central processing unit (CPU) 41 executes software such as application software or system software which is loaded into a main memory 43. A graphics processing unit (GPU) 42 generates a display image in response to an instruction issued from the software. The main memory 43 includes a random access memory (RAM) and the like, and stores a program which the CPU 41 uses, data which the GPU 42 uses, and the like. A storage 44 includes a NAND-type flash memory and the like, and is utilized as a built-in auxiliary storage apparatus. The camera 36, for example, includes a complementary metal oxide semiconductor (CMOS) image sensor, and generates image data obtained by photographing the circumference of the information processing apparatus 10.

In an interface 50, a manipulation section 37 is means for various kinds of manipulations in the information processing apparatus 10, and includes the manipulation button 34 and the cursor key 35. It should be noted that other manipulation means such as an analog stick may be provided. A touch pad 32 is a multi-touch pad, and is arranged so as to be superposed on the surface of the display apparatus 31. A speaker 38 outputs a sound generated by the functions of the information processing apparatus 10, and a microphone 39 receives as input thereof a sound in the circumference of the information processing apparatus 10.

A game card slot 45 is an outlet into which a recording medium in which game software is recorded is to be plugged. It should be noted that a reading medium in which application software other than the game software is recorded may be plugged into the game card slot 45. A memory card slot 46 is an outlet into which a memory card is to be plugged. The application software downloaded from an external server, save data and the like, for example, are preserved in the memory card.

In the information processing system 1 in the embodiment, when the user holds the card 20 up the information reading/writing section 30, the information reading/writing section 30 reads out the information recorded in the card 20, and the system software specifies the software responsible to the card 20 of interest. The specified software is a specific function of the application software or the system software. As described above, the following information is recorded in the card 20.

(1) Card UID

A card UID is a unique medium number (for example, a serial number) peculiar to the card, and does not overlap any of other cards.

In the embodiment, the card UID, for example, is utilized for managing the user, and for limiting the use of the specific card 20. It should be noted that the card UID may also be utilized for deciding authenticity of the card 20.

(2) Kind-of-Card ID

A kind-of-card ID is information specifying a kind of card, and the information processing apparatus 10 decides the behavior of the kind-of-card ID in accordance with the kind of card. For example, it is decided in the kind-of-card ID of the "friend card" that the friend registration application is executed, thereby friend-registering the user associated with the card UID of the "friend card" in the information processing apparatus 10. In addition, it is decided in the kind-of-card ID of the "content card" that the download application is executed to download the content (application software) associated with the "content card" from the management server 4 to install the content.

Such a behavior of the information processing apparatus 10 is managed in a behavior database (hereinafter, referred to as a "behavior DB") in the management server 4. When the information processing apparatus 10 previously downloads the behavior DB from the management server 4 and thereafter, acquires the kind-of-card ID, the information processing apparatus 10 executes the processing associated with the kind-of-card ID by referring to the behavior DB. The information processing apparatus 10 downwards the behavior DB, so that even when the information processing apparatus 10 is not connected to the network 3 at the time of acquisition of the kind-of-card ID, the information processing apparatus 10 can locally specify the processing associated with the kind-of-card ID. It should be noted that if the information processing apparatus 10 is connected to the network 3, then, the information processing apparatus 10 inquires the processing associated with the kind-of-card ID to the management server 4, so that the processing to be executed may be instructed to the information processing apparatus 10.

(3) Dedicated Data

Dedicated data is (unrewritable) data which is written by a distribution source of the card 20, and is utilized to reflect the data of interest in the processing of the software. For example, the dedicated data of the "URL calling card" is a URL of a Web page to be browsed. For this reason, even in the case of the same URL calling card in terms of the kind of card, the card differs depending on the Web page to be browsed. For this reason, it is preferable that the information associated with the Web page is printed on the surface of the card 20, and the user can distinguish the card 20 every Web page.

It should be noted that the user may be able to freely write the data to the card 20 depending on the kind of card 20. The card to which only the dedicated data is to be written, and the card to which the kind-of-card ID and the dedicated data are to be written may be present in terms of the writable card 20. In this case, the user freely writes the data to the writable card, and thus the user can produce the card 20 to meet the needs. For example, the parent may produce the original URL calling card to which a predetermined URL is written to the card 20 from the terminal apparatus such as the smartphone, and may hand over the original URL calling card as a present to the child.

Figure 4:
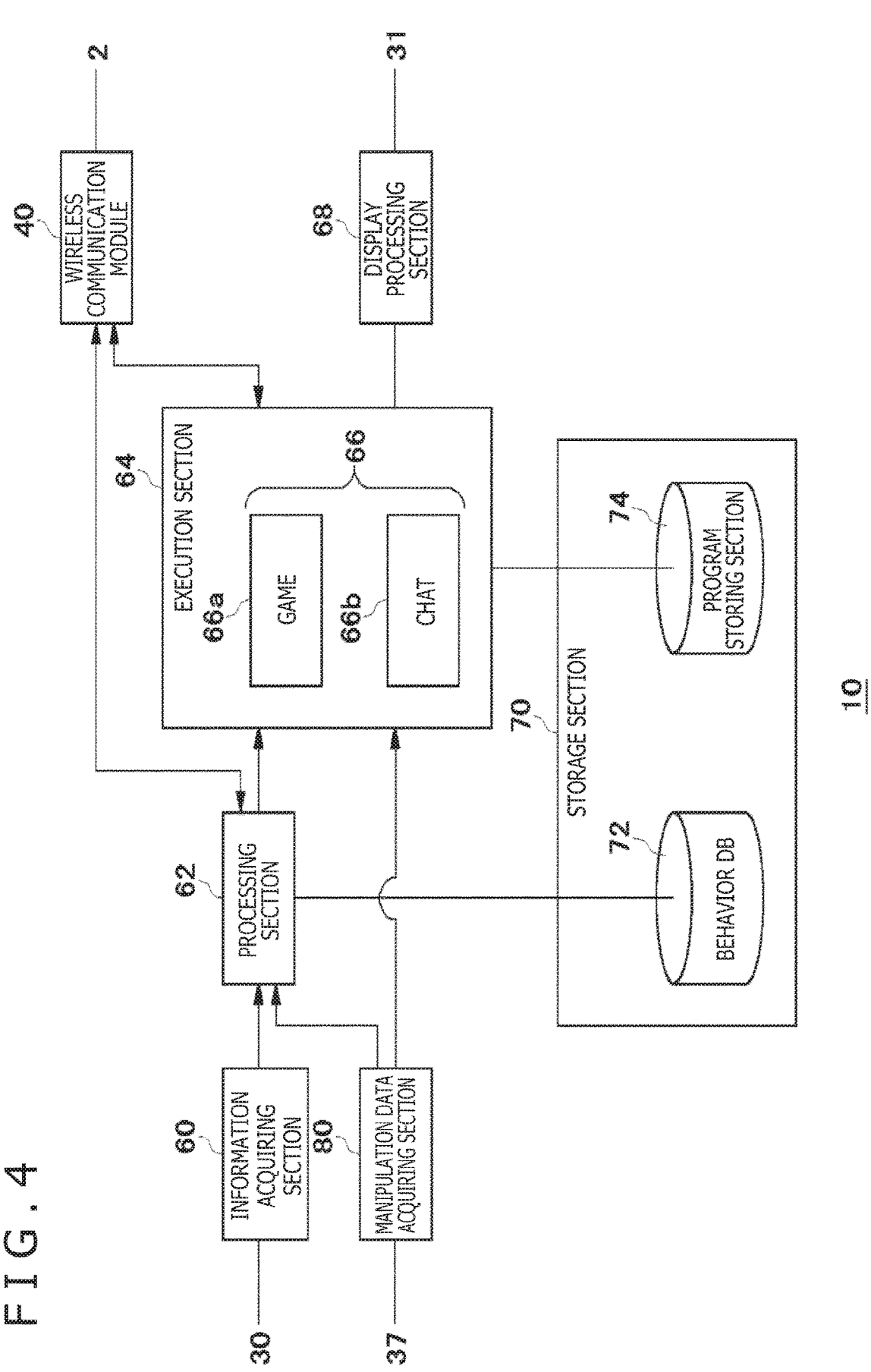
FIG. 4 is a block diagram depicting a configuration of the information processing apparatus.

FIG. 4 depicts a configuration of the information processing apparatus 10. The information processing apparatus 10 is provided with an information acquiring section 60, a processing section 62, an execution section 64, a display processing section 68, a manipulation data acquiring section 80, and a storage section 70. The storage section 70 may include a plurality of recording media such as a storage 44, a memory card, and a game card, and is provided with a behavior DB 72 and a program storing section 74. The program storing section 74 stores system software and a plurality of application software. It should be noted that the application software includes not only software which is downloaded from the management server 4 into the memory card, but also software which is pre-installed in the information processing apparatus 10. For example, the application for registering the friend is pre-installed in the storage 44 before the shipment of the information processing apparatus 10.

In FIG. 4, the constituent elements which are described as the functional blocks for executing the various processing can be configured by a circuit block, a memory and other large scale integration (LSI) in terms of the hardware, and can be realized by the program and the like which are loaded into the memory. Therefore, it is understood by a person skilled in the art that these functional blocks can be realized as various forms of only the hardware, only the software, or a combination thereof, and the present invention is by no means limited to any one of them.

The behavior DB 72 stores the kind-of-card ID, and the software associated with the kind-of-card ID. The management server 4 manages the kind-of-card ID on the basis of the newest state, and the behavior DB is successively updated in the case where the number of kinds of cards 20 is increased, or the function of the card 20 is added. It is preferable that whenever the information processing apparatus 10 accesses the management server 4, the management server 4 transmits the storage contents of the newest behavior DB to the information processing apparatus 10. As a result, the information processing apparatus 10 shall have the behavior DB 72 in which the newest state is reflected. Specifically, the behavior DB 72 stores the kind-of-card ID, and the processing for the software associated with the kind-of-card ID, and the storage contents are utilized in the software control by the processing section 62.

In the embodiment, the information reading/writing section 30 reads out the information recorded in the card 20 which is held up by the user. The information acquiring section 60 acquires the information read out by the information reading/writing section 30. Here, the acquired information includes the kind-of-card ID as the identification information, and further includes the card UID as the medium number peculiar to the recording medium. In addition, if the information reading/writing section 30 reads out the dedicated data recorded in the card 20, then, the information acquiring section 60 acquires the dedicated data as well of the card 20.

When the identification information is acquired by the information acquiring section 60, the processing section 62 specifies the software associated with the acquired identification information by referring to the storage contents of the behavior DB 72. For example, when the kind-of-card ID shows the "friend card," the processing section 62 specifies the software associated with the friend card by referring to the storage contents of the behavior DB 72. In addition, when the kind-of-card ID shows the "content card," the processing section 62 specifies the software associated with the content card. In addition, when the kind-of-card ID shows the "URL calling card," the processing section 62 specifies the browser associated with the URL calling card. In a word, the behavior DB 72 includes the information with which the processing section 62 specifies the software responsible to the card 20 on the basis of the kind-of-card ID. For this reason, it is preferable that the information processing apparatus 10 frequently accesses the management server 4 to maintain the behavior DB 72 in the newest state.

As described above, the behavior DB 72 stores the kind-of-card ID, and the processing for the software associated with the kind-of-card ID. The processing section 62 executes the processing stored in the behavior DB 72 for the specified software.

Hereinafter, a description will be given with respect to the processing responding to the kind of cards 20.

"Friend Card"

Figure 5:
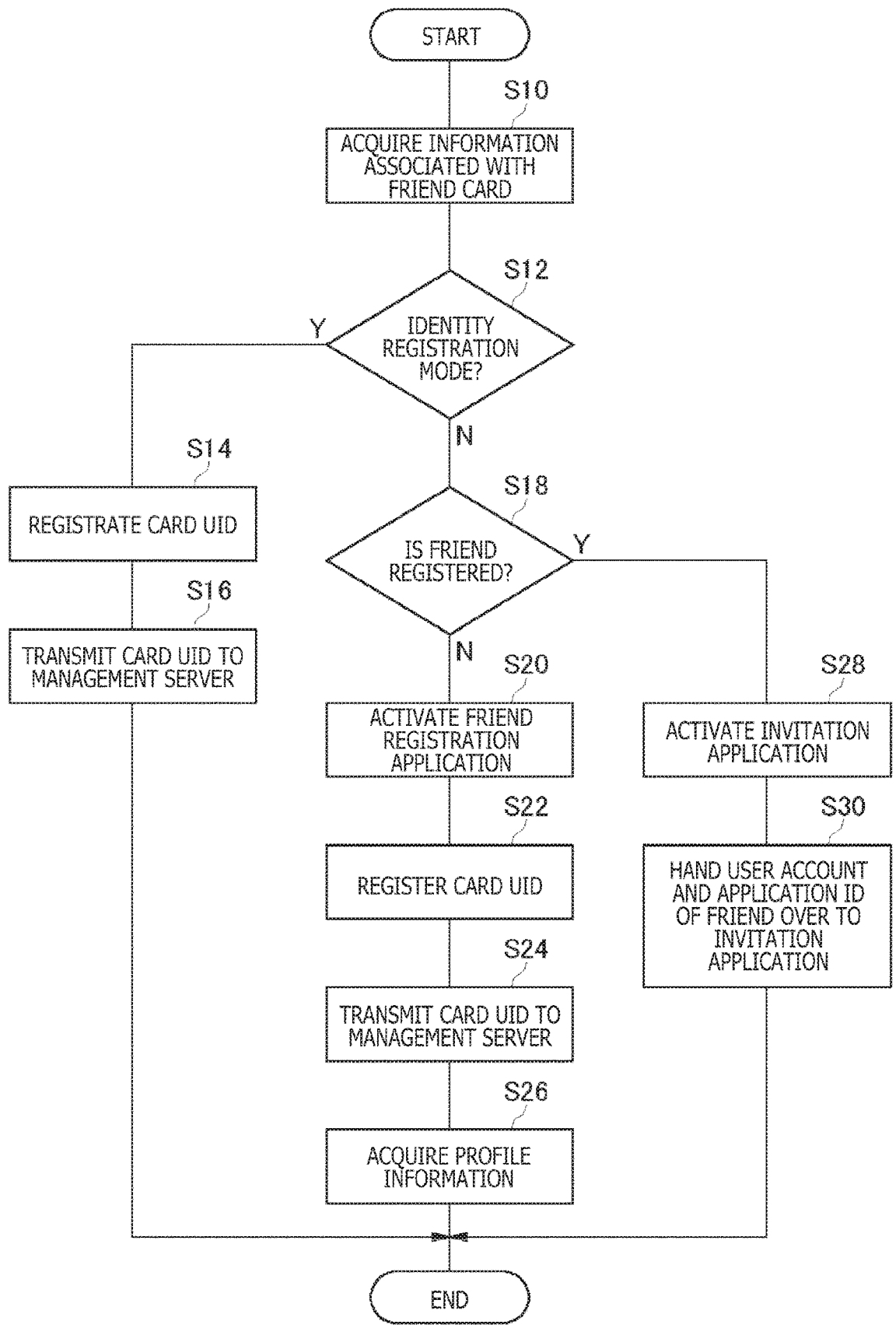
FIG. 5 is a flow chart depicting an example of processing in the information processing apparatus.

FIG. 5 depicts processing of the information processing apparatus 10 when the user utilizes the friend card.

The behavior DB 72 stores the kind-of-card ID and the processing for the software every situation when the information acquiring section 60 acquires the kind-of-card ID. In the processing for the friend card 20 depicted in FIG. 5, the situations in each of which the information acquiring section 60 acquires the kind-of-card ID of the friend card 20 are classified into the following three situations.

(A) Situation in Identity Registration Mode (Y in S12)

In the information processing system 1, the friend card is used as the business card. For this reason, the friend card which is handed over to the party and the information representing oneself need to be registered so as to be associated with each other in the management server 4. Although the card UID and the kind-of-card ID are registered in the card 20, the management server 4 associates the card UID of the card 20 which the user possesses with the information representing oneself (user account). The association processing is executed in the identity registration mode.

(B) Situation in Which Friend Registration is Performed (N in S18)

When the friend cards as the business cards are exchanged between two users, the user causes the information reading/writing section 30 of the information processing apparatus 10 to read the information associated with the friend card of the party. The information on the friend card thus read out is transmitted to the management server 4, and the management server 4 transmits the profile information of the party to the information processing apparatus 10. Use of the friend card results in that the user can simply acquire the profile information associated with the party.

(C) Situation in Which Some Sort of Action (for example, invitation) is Performed for Registered Friend (Y in S18)

During the play of the game, the user causes the information reading/writing section 30 to read out the information on the friend card of the friend. When the information processing apparatus 10 specifies the user account of the friend from the card UID and transmits the user account to the management server 4, the management server 4 transmits an invitation message to the information processing apparatus 10 of the friend. It should be noted that the invitation of the friend is an exemplification, and what kind of processing is executed may be decided by a card distribution subject, and the processing contents are managed by the behavior DB 72 so as to be associated with the kind-of-card ID.

In such a manner, in the information processing apparatus 10, the different behaviors are shown every situation when the friend card is utilized. As described above, the behavior DB 72 stores the kind-of-card ID and the processing for the software with the kind-of-card ID and the processing being associate with each other every situation when the information acquiring section 60 acquires the kind-of-card ID. The processing section 62 executes the processing for the software in accordance with the situation when the information acquiring section 60 acquires the kind-of-card ID.

Figure 6:
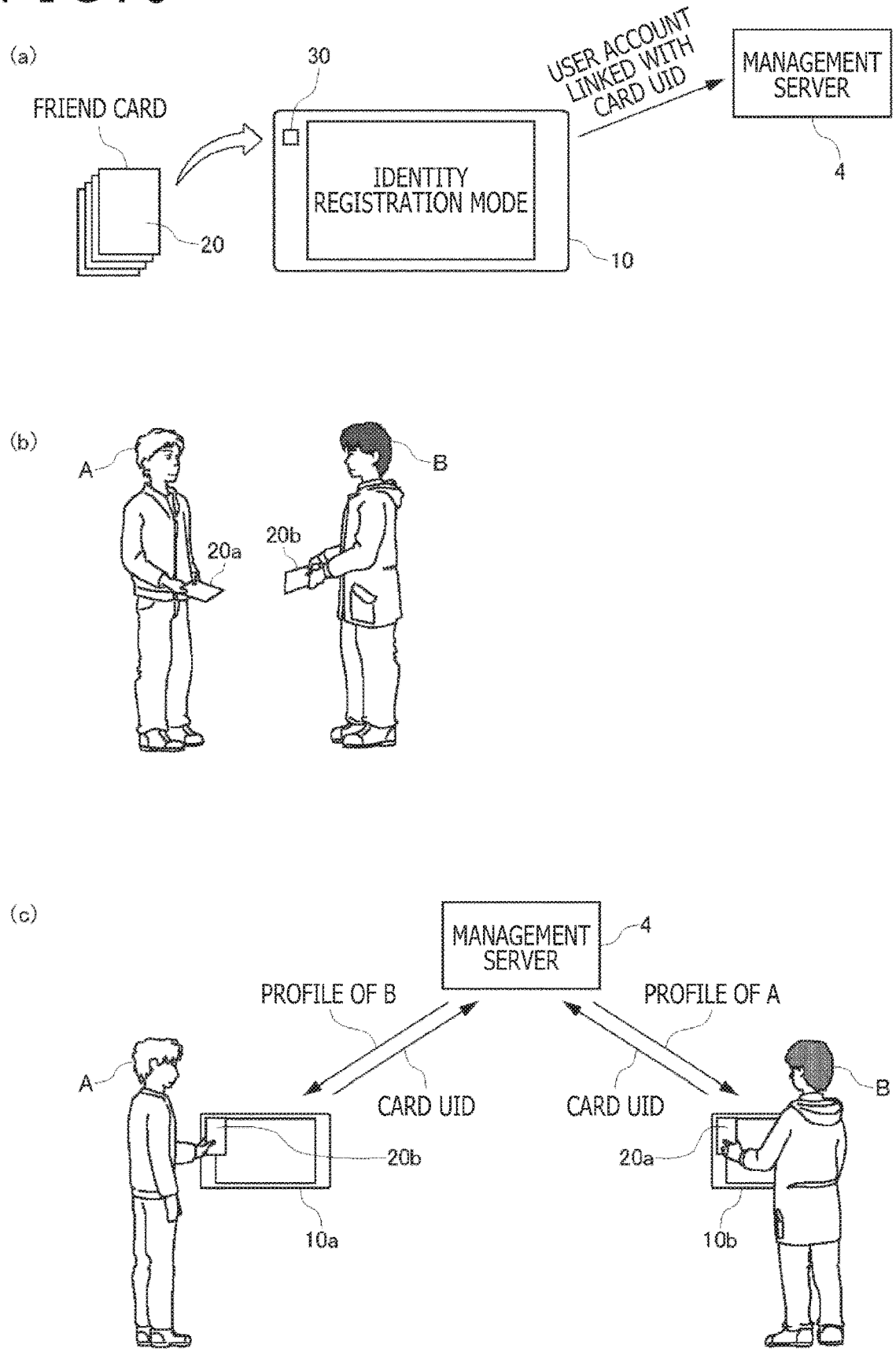
FIG. 6 is a view for explaining a scene of use of a card.

FIG. 6(a) is a view for explaining a manipulation for associating the card UID with the information representing oneself. The information processing apparatus 10 and the management server 4 executes the processing for identity-registering the friend card 20 in conjunction with each other. This processing of interest is executed in such a way that the information processing apparatus 10 transmits the card UID of his/her friend card linked to the user account to the management server 4, and the management server 4 stores the card UID transmitted thereto as the card UID of the identity card so as to be associated with the user account.

Firstly, the information processing apparatus 10 executes application software for the identity card registration in accordance with the instruction issued from the user. It should be noted that the application software may also be software configuring one function of the system software. During the execution of the application software, the information processing apparatus 10 is in the identity registration mode. In the identity registration mode, when the user holds his/her friend card up the information reading/writing section 30, the user holds his/her friend card up the information reading/writing section 30, the information acquiring section 60 acquires the card UID and the kind-of-card ID of the friend card, and supplies the card UID and the kind-of-card ID of the friend card to the processing section 62 (S10).

The processing section 62 decides whether or not the mode is the identity registration mode (S12). When the processing section 62 confirms that the mode is the identity registration mode (Y in S12), the processing section 62 hands the acquired card UID over to the identity registration application. As a result, the identity registration application registers the card UID as the UID of the card of the user (oneself) in the storage section 70 (S14), and transmits the card UID together with the information representing that the card UID is acquired in the identity registration mode to the management server 4 (S16). As a result, the management server 4 stores the card ID of the identity UID so as to associate the card ID of the identity UID with the user account.

Incidentally, when the management server 4 receives the card UID, the management server 4 may decide whether the card UID of interest has already been identity-registered by another user. At this time, if the card UID has already been stored so as to be associated with the use account of another user, then, the management server 4 may notify the information processing apparatus 10 of the effect that it might be impossible to identity-register the card UID of interest. As a result, the user may disable to register the card which is picked up, or the card which he/she gets from the friend as his/her card.

Here, the behavior DB 72 stores the processing for handing the card UID over to the identity registration application in the state in which the card is the identity registration mode so as for the card UID to be associated with the kind-of-card ID representing the friend card. For this reason, when the kind-of-card ID and the card UID of the friend card are supplied in the identity registration mode to the processing section 62, the processing section 62 executes the processing for handing the card UID over to the identity registration application by referring to the storage contents of the behavior DB 72.

For example, the friend cards are collectively sold in units of dozens, and the user performs the identity registration work for the friend card before he/she hands the friend card over to another user. It is only necessary that during the execution of the application for identity card registration, the friend card is held up the information reading/writing section 30, and it does not take time to perform the work so much. In such a manner, each of the users has the friend card (his/her business card) which was subjected to the identity registration.

FIG. 6(b) depicts a scene in which the friend cards are exchanged with each other. A user A holds a card 20a which was subjected to the identity registration over to a user B, and the user B holds the card 20b which was subjected to the identity registration over to the user A. In such a manner, the friend cards are physically exchanged between the users.

FIG. 6(c) depicts a scene in which the friend registration is performed. The user A holds the card 20b which was gotten from the user B up the information reading/writing section 30 of an information processing apparatus 10a of the user A. The information acquiring section 60 acquires the kind-of-card ID and the card UID which are recorded in the card 20b, and supplies the kind-of-card ID and the card UID to the processing section 62 (S10).

The processing section 62 decides whether or not the mode is the identity registration mode (S12). When the processing section 62 confirms that the mode is not the identity registration mode (N in S12), the processing section 62 decides whether the acquired card UID is registered as the card UID of the friend (S18). When the processing section 62 decides that the acquired card UID is not registered as the card UID of the friend (N in S18), the processing section 62 activates the friend registration application software (S20), and hands the acquired card UID over to the friend registration application software. It should be noted that the friend registration application software may be software configuring one function of the system software.

As a result, the friend registration application registers the card UID of the user B as the card UID of the friend in the storage section 70 (S22), and transmits the card UID of the friend together with the information representing that the card UID of the friend was acquired in the friend registration mode to the management server 4 (S24). The management server 4 stores the card UID transmitted thereto as the card UID of the identity card so as to be associated with the user account of the user B by executing the identity registration processing of the user B. As a result, the management server 4 specifies that the card UID transmitted thereto is the user B, and registers the user B as the friend of the user A. In addition, the management server 4 transmits the profile information of the user B together with the user account of the user B to the information processing apparatus 10a of the user A.

In the information processing apparatus 10a, the friend registration application acquires the profile information associated with the user B, and stores the profile information associated with the user B in the storage section 70 (S26). Although the friend registration application registers the profile information in the storage section 70 with the profile information being linked with the user account of the user B, at this time, the friend registration application associates the card UID as well of the user B with the user account.

Here, the behavior DB 72 stores the processing for handing the card UID over to the friend registration application with the card UID being associated with the kind-of-card ID representing the friend card. In this case, the situation is such that the mode is not the identity registration mode, and the card UID is not registered as the card UID of the friend. For this reason, when the kind-of-card ID and the card UID of the friend card are supplied to the processing section 62, the processing section 62 executes the processing for handing the card UID over to the friend registration application by referring to the storage contents of the behavior DB 72.

The processing similar to the processing described above is executed in the information processing apparatus 10b as well of the user B. The user B holds the card 20a gotten from the user A up to the information reading/writing section 30 of the information processing apparatus 10b of the user B. The information acquiring section 60 acquires the kind-of-card ID and the card UID recorded in the card 20a. When the processing section 62 confirms that the kind-of-card ID represents the "friend card," and the card UID is not recorded so as to be associated with the user account of the user A, the processing section 62 executes the processing for activating the friend registration application, and handing over the card UID by referring to the storage contents of the behavior DB 72.

The management server 4 acquires the card UIDs in the friend registration processing from the information processing apparatus 10a of the user A and the information processing apparatus 10b of the user B, respectively. If the identity cards are suitably exchanged between the user A and the user B, then, the management server 4 recognizes that the card UID associated with the user B should be transmitted from the information processing apparatus 10a, and the card UID associated with the user A should be transmitted from the information processing apparatus 10b.

At this time, in the case where the card UID transmitted from the information processing apparatus 10a is not the card UID of the user B, or the card UID transmitted from the information processing apparatus 10b is not the card UID of the user A, the management server 4 can confirm that the identity registration is not performed in the friend card used as the identity card, or the friend card of the different user is used. In the case where the consistency between the card user and the card UID is not established, the management section 4 does not transmit the profile information to the information processing apparatus 10, and does not mutually register the users as the friends. In a word, with the fact that the card UID of the user B is transmitted from the information processing apparatus 10a, and the card UID of the user A is transmitted from the information processing apparatus 10b as the condition, the management server 4 may transmit the profile information associated with the user B and the user A to the information processing apparatus 10a and the information processing apparatus 10b, respectively. As a result, it may be impossible for the user to illegally acquire the profile information of others.

The friend registration processing described above is executed on the assumption that the information processing apparatus 10a of the user A and the information processing apparatus 10b of the user B are connected to the management server 4. However, even under the environment in which the information processing apparatus 10b of the user A and the information processing apparatus 10b of the user B are not connected to the management server 4, the friend registration processing may be executed.

In this case as well, the user A holds the card 20b gotten from the user B up the information reading/writing section 30 of the information processing apparatus 10a, and the user B holds the card 20a gotten from the user A up the information reading/writing section 30 of the information processing apparatus 10b. The friend registration applications register the card UIDs of the parties as the card UIDs of the friends in the storage sections 70, respectively, and transmits the card UIDs of the friends together with the information representing that the card UIDs of the friends are acquired in the friend registration mode to the information processing apparatuses 10 of the parties through the ad hoc communication. As a result, the information processing apparatus 10a of the user A receives the card UID of the user B from the information processing apparatus 10b of the user B, and the information processing apparatus 10b of the user B receives the card UID of the user B from the information processing apparatus 10a of the user A.

The information processing apparatus 10a notifies the information processing apparatus 10b of that the card UID of oneself (user A) is received, and the information processing apparatus 10b notifies the information processing apparatus 10a of that the card UID of oneself (user B) is received. As a result, it is confirmed that the friend cards are exchanged between the user A and the user B. Incidentally, since the profile information is not included in the friend card, the information processing apparatuses 10*a* and 10*b* will acquire the profile information of the friends when the information processing apparatuses 10*a* and 10*b* will be connected to the management server 4 later. In the case where the friend card is a writable card, the user may write his/her name in the identity registration mode, and the friend's name written the friend card may be displayed until the information processing apparatus 10 of the party acquires the profile information from the management server 4.

It should be noted that in the case where at the time of the exchange of the friend cards, the user B hands a friend card of another user C over to the user A, the information processing apparatus 10*b* receives a card UID of the user C from the information processing apparatus 10*a* of the user A. At this time, since the card UID of the user C is not registered as the card UID of oneself (user B) in the storage section 70 of the information processing apparatus 10*b*, the friend registration application of the information processing apparatus 10*b* may notify the information processing apparatus 10*a* of the effect that the friend registration processing is invalid.

Since in the friend registration processing in the embodiment, the user has only to simply exchange the friend card with that of the party to cause the information reading/writing section 30 to read the friend card of the party, the user can simply perform the friend registration. In addition, for exchanging the friend cards with each other, both the users also need actually see each other, and the effect that the communication in the real world is also promoted is expected.

In such a manner, in the information processing system 1, the user possesses the friend card of other users (friends). After the friend registration is performed, the friend card, for example, is also used to invite the friend to the application being executed.

The execution section 64 reads out the application stored in the program storing section 74 to execute the application. In the example depicted in FIG. 4, a state is depicted in which a game 66*a* and a chat 66*b* are simultaneously executed. Hereinafter, in the case where the game 66*a* and the chat 66*b* are not especially distinguished from each other, the game 66*a* and the chat 66*b* are simply referred to as an application 66 in some cases.

A description will now be given with respect to processing in the case where during the execution of the game 66*a* and the chat 66*b*, the user A causes the information reading/writing section 30 to read out the friend card of the user B. The information acquiring section 60 acquires the kind-of-card ID and the card UID which are recorded in the friend card, and supplies the kind-of-card ID and the card UID to the processing section 62 (S10).

The processing section 62 decides whether or not the mode is the identity registration mode (S12). When the processing section 62 confirms that the mode is not the identity registration mode (N in S12), the processing section 62 decides whether the acquired card UID is registered as the card UID of the friend (S18). In the case where the acquired card UID is registered as the card UID of the friend (Y in S18), the processing section 62 activates the invitation application software (S28). Then, the processing section 62 hands a user account of the friend corresponding to the acquired card UID, and an application ID specifying the application to which the friend is to be invited over to the invitation application software (S30). It should be noted that the invitation application software may be software configuring one function of the system software.

Here, the behavior DB 72 stores processing for handing the friend identification information (the user account of the friend) over to the invitation application, in the situation in which the mode is not the identity registration mode, and the card UID is registered as the card UID of the friend, with the friend identification information being associated with the kind-of-card ID representing the friend card. For this reason, when the kind-of-card ID and the card UID of the friend card are supplied to the processing section 62, the processing section 62 executes the processing for handing the card UID over to the invitation application by referring to the storage contents of the behavior DB 72.

The invitation application executes processing for inviting the friend to the application 66 being executed. Here, since the game 66*a* and the chat 66*b* are present in the application 66 being executed, the processing section 62 decides which of the game 66*a* and the chat 66*b* the friend is invited.

Firstly, the processing section 62 decides whether or not the friend can be invited to a plurality of applications 66 being executed. If all the applications 66 being executed do not correspond to the friend invitation, then, since it may be impossible for the processing section 62 to specify the application corresponding to the invitation of the friend, the processing section 62 ignores the manipulation by the friend card. Incidentally, if only one application 66 corresponds to the invitation of the friend, then, the processing section 62 decides the application of interest as the application to which the friend is to be invited, and hands the user account and the application ID of the application of interest of the friend over to the invitation application.

On the other hand, if of a plurality of applications 66 being executed, two or more applications 66 correspond to the invitation of the friend, then, the processing section 62 may decide any one of the applications as the application to which the friend is to be invited on the basis of the following standards.

As one standard, the priority to be selected is set to the application 66 to which the friend is to be invited in advance, and the processing section 62 decides the application in accordance with the priority. Although the priority may be default-set, the priority may be set by the user. Setting information associated with the priority is stored in the storage section 70. In the case where when the chat 66*b* is set higher in priority than the game 66*a* when the game 66*a* is compared in priority with the chat 60*b*, the processing section 62 decides the chat 66*b* as the application to which the friend is to be invited.

As another standard, the processing section 62 decides the application 66 which is currently manipulated by the user as the application to which the friend is to be invited. The processing section 62 may decide the application 66 which is being executed in the foreground as the application to which the friend is to be invited.

As still another standard, the processing section 62 may decide the application to which the friend is to be invited in accordance with a picture structure. For example, in the case where two pictures are displayed in picture-in-picture style, the application which performs a main picture display may be decided as the application to which the friend is to be invited.

In such a manner, the processing section 62 decides one of the applications, being executed, to which the friend can be invited as the application to which the friend is to be invited on the basis of the standards described above. As a result, the invitation application transmits the user account and the application ID of the friend to the management server 4, and the management server 4 notifies the information processing apparatus 10 of the friend of the effect that the invitation has been mode.

Incidentally, in the case where the processing section 62 automatically selects the application on the basis of the selection standard described above, the processing section 62 may confirm whether this automatic selection is performed along the intension of the user. For this reason, when the processing section 62 specifies any of the applications, the processing section 62, for example, may cause the display apparatus 31 to display a confirmation message of "may I invite my friend to the chat?" from the display processing section 68. At this time, graphical user interface (GUI) of selecting "Yes" or "No" is provided to the user. When the user selects "Yes," the processing section 62 may invite the friend to the chat, while when the user selects "No," the processing section 62 may decide to invite the friend to the game.

In the past game machine, in order that the user may invite the friend who is playing the game, it was necessary that after the game play was temporarily suspended, the user selected the friend from the invitation application for the friend. As compared with this, since the user can simply call the friend without suspending the game play, very convenient user interface is obtained.

"Content Card"

A content card is a card for downloading content (application software) from the management server 4 and installing the content, and activating the content after the download. In the content card, the kind-of-card ID includes information for specifying the content to be downloaded.

The behavior DB 72 stores processing for, in the case where the content (application) specified by the kind-of-card ID are not downloaded, handing identification information (application ID) of the content over to the download application with the content being associated with the kind-of-card ID representing the content card, and processing for, in the case where the content were downloaded, activating the content of interest.

FIG. 7 depicts processing in the information processing apparatus 10 when the user utilizes the content card.

When the user holds the content card up the information reading/writing section 30, the information acquiring section 60 acquires the card UID and the kind-of-card ID of the content card, and supplies the card UID and the kind-of-card ID of the content card to the processing section 62 (S40).

The processing section 62 decides whether or not the application software specified by the kind-of-card ID was downloaded (S42). The kind-of-card ID in the content card differs every application. In a word, the content card of the game A, and the content card of the game B are different in kind-of-card ID from each other. For this reason, although the content card of the game A, and the content card of the game B has the same kind in lumping of the content card, the content cards of the game A, and the content card of the game B are handled as different cards in the information processing system 1.

The identification information (application ID) associated with the content as the target is stored for the kind-of-card ID in the behavior DB 72. After the application ID is specified from the kind-of-card ID by referring to the storage contents of the behavior DB 72, the processing section 62 decides whether or not the application software of interest was downloaded.

When the processing section 62 decides that the application software of the interest is not downloaded (N in S42), the processing section 62 activates the download application and hands the application ID over to the download application (S44). As a result, the download application downloads the corresponding application software from the management server 4. On the other hand, when the application software of interest is downloaded (Y in S42), the processing section 62 activates the corresponding application software (S46).

The behavior DB 72 stores the kind-of-card ID, and the processing for the application every situation when the information acquiring section 60 acquires the kind-of-card ID. The processing section 62 specifies the application which is to execute the processing in accordance with the situation when the information acquiring section 60 acquires the kind-of-card ID. When the user holds the content card up the information reading/writing section 30, the content is automatically downloaded and after the downloading (installation), the content is automatically activated by performing the same manipulation.

According to the embodiment, the user uses the content card, resulting in that unlike the related art, it is unnecessary that the management server 4 is accessed to select the content to be downloaded and it is also unnecessary that during the activation, the content is selected from a menu picture.

It should be noted in the case where when the processing section 62 decides that the application software of the interest is not downloaded (N in S42), the processing section 62 preferably provides the card UID together with the application ID to the download application. When the download application transmits a download request of the application to the management server 4, the download application transmits the card UID as well together with the user account to the management server 4. The management server 4 may manage the card UID so as to be associated with the content so that the same content card is prevented from being utilized by another user, and may admit that the same user performs the download multiple times. Incidentally, in the case where the same content card is utilized by another user, the management server 4 may download trial version application software into another user. Another user is caused to execute the trial version application, thereby enabling the presence of the application to be spread among the users.

It should be noted that as the card similar to the content card, an item card with which an item used in the game is downloaded, and after the downloading, the lock of the item is released may be present. In addition, a wallpaper card with which a wallpaper of the picture is downloaded may be present. The user who possesses a plurality of wallpaper cards holds the wallpaper card up the information reading/writing section 30, thereby enabling the wallpaper to be simply changed.

"URL Calling Card"

The URL calling card is a card for activating the browser, and causing a predetermined URL to be automatically accessed. The URL calling card records URL as the dedicated data in addition to the card UID and the kind-of-card ID.

The behavior DB 72 stores processing for activating the browser with the browser being associated with the kind-of-card ID representing the URL calling card, and handing the dedicated data (URL) over to the browser. When the user holds the URL calling card up the information reading/writing section 30, the information acquiring section 60 acquires the card UID, the kind-of-card ID, and the dedicated data (URL) of the URL calling card, and supplies the card UID, the kind-of-card ID, and the dedicated data of the URL calling card to the processing section 62.

The processing section 62 executes processing associated with the URL calling card, that is, processing for activating the browser, and handing the dedicated data over to the browser by referring to the storage contents of the behavior DB 72. The browser acquires the URL as the dedicated data, and accesses a Web page specified by the URL. An illustration or the like with which a page to be browsed is at a glance is printed on the URL calling card. According to the embodiment, the user uses the URL calling card, so that he/she can simply access a desired Web page.

It should be noted that in the case where the program storing section 74 stores the software of a plurality of browsers, the processing section 62 may select one browser on the basis of the following standards.

As one standard, the priorities to be selected are set in a plurality of browsers in advance, and the processing section 62 decides the browser in accordance with the priority. For example, in the case where the browser A and the browser B are present, if the priority of the browser A is set higher than that of the browser B, then, the processing section 62 decides the browser A as the application to be activated. Incidentally, when the user browses the Web page by using the URL calling card, according to this standard, the browser A is usually activated. However, the user can manually select the browser B from the application selection picture which has been prepared from the past in the information processing apparatus 10. For example, the selection priority of the browser may be set higher in the case where the installation is newly performed. It should be noted that the user may freely set the priorities of a plurality of browsers.

As another standard, the processing section 62 decides the browser which was used in the most recent as the application to be activated. The possibility that the browser which was used in the most recent was used for preference by the user is high. Then, the processing section 62 may specify which the browser used in the most recent is, and may activate the browser of interest.

It should be noted that a card with which moving image content or music content on the Internet are reproduced or downloaded may be prepared as a card similar to the "URL calling card."

"Function Setting Card"

A function setting card is a card with which the function in the information processing apparatus 10 is set. When the user holds the function setting card up the information reading/writing section 30, the information acquiring section 60 acquires the card UID and the kind-of-card ID of the function setting card, and supplies the card UID and the kind-of-card ID of the function setting card to the processing section 62. It should be noted that if the dedicated data is recorded in the function setting card, then, the information acquiring section 60 supplies the dedicated data as well to the processing section 62. Various function setting cards may be prepared in response to the use applications. With respect to the functional setting card, the behavior DB 72 stores processing for executing a specific function (module) of the system software for performing the function setting with the specific function being associated with the kind-of-card ID representing the function setting card.

(a) Card for Limiting Utilization of User

For example, this card is used when the parent limits the utilization of the information processing apparatus 10 by the child.

A "red card" is the function setting card with which the information thereof is caused to be read out by the information reading/writing section 30, thereby prohibiting the utilization of the information processing apparatus 10. When the "red card" is held up the information reading/writing section 30 by the parent, hereinafter, the processing section 62 prohibits the utilization of the information processing apparatus 10 by the child. Thereafter, in the case where the "red card" is held up the information reading/writing section 30 or another "release card" is held up the information reading/writing section 30, the processing section 62 releases the prohibition of the utilization of the information processing apparatus 10 by the child.

A "yellow card" is the function setting card with which the information thereof is caused to be read out twice by the information reading/writing section 30, thereby prohibiting the utilization of the information processing apparatus 10. When the "yellow card" is held up twice the information reading/writing section 30, hereinafter, the processing section 62 prohibits the utilization of the information processing apparatus 10 by the child. Thereafter, in the case where the "yellow card" is held up the information reading/writing section 30 or another "release card" is held up the information reading/writing section 30, the processing section 62 releases the prohibition of the utilization of the information processing apparatus 10 by the child.

A "timer card" is the information setting card with which the information thereof is caused to be read out by the information reading/writing section 30, thereby setting a utilization time in one day of the information processing apparatus 10. When the "timer card" is held up the information reading/writing section 30 by the parent, the processing section 62 clocks the utilization time in one day by the child, and prohibits the utilization in a time exceeding the utilization time. For the purpose of enabling a plurality of utilization times to be selected, a plurality of timer cards such as a "timer card" for one hour, and a "timer card" for two hours is prepared. It should be noted that the writable card 20 is utilized as the timer card, so that the parent may cause a favorite time to be written to the timer card.

(b) Card in Which Setting Information on Information Processing Apparatus 10 is Registered This card is used when the setting of the information processing apparatus 10.

A "parental setting card" is the function setting card with which the information thereof is caused to be read by the information reading/writing section 30, thereby causing the information processing apparatus 10 to perform the parental setting. The parental setting information is recorded as the dedicated data in the "parental setting card." In this case, the writable card 20 is utilized as the parental setting card, and the parent writes setting information to the parental setting card. When the "parental setting card" is held up the information reading/writing section 30 by the parent, the processing section 62 automatically registers the parental setting information.

A "network setting card" is the function setting card with which the information thereof is caused to be read by the information reading/writing section 30, thereby causing the setting information to be registered in the information processing apparatus 10. The setting information for utilizing a communication environment of one's home is recorded as the dedicated data in the "network setting card." In this case, the writable card 20 is utilized as the network setting card, and the setting information associated with the communication environment of one's home is written to the network setting card. In the case where a plurality of information processing apparatuses 10 is present in one's home, if the user produces the "network setting card," then, the setting information can be simply registered in all the information processing apparatuses 10. It should be noted that there is a way to use with which when the friend comes to user's home, the information processing apparatuses 10 of the friend is caused to read the information in the "network setting card," thereby causing the information processing apparatuses 10 of the friend to temporarily make a communication at user's home.

"Wallet Card"

A wallet card is a card for settlement in the information processing system 1. For example, at the time of purchase of the content or the additional item, the user causes the information in the "wallet card" to be read by the information reading/writing section 30, thereby enabling the automatic settlement to be performed. Although the "wallet card" itself may be sold in the store, alternatively, the parent may write the amount of money to the "wallet card." With respect to the wallet card, the behavior DB 72 stores processing for handing the amount of money of the purchase over to the application for settlement with the amount of money of the purchase being associated with the kind-of-card ID representing the wallet card.

"Blank Card"

A blank card is a card to which the kind-of-card ID and the dedicated data can be written by the user. It should be noted that since the card UID is the information peculiar to the card 20, it may be impossible to rewrite the card UID. The user writes desired information to the blank card, thereby enabling the blank card to be utilized in a desired use application.

As set forth hereinabove, the present invention has been described on the basis of the embodiment. However, it is understood by a person skilled in the art that the embodiment is merely an exemplification, and various modified changes can be made in combinations of the constituent elements or processing processes thereof, and such modified changes also fall within the scope of the present invention.

Although in the embodiment, the description is given with respect to the case where the application control is performed by the processing section 62 in accordance with the information recorded in the one sheet of card 20, the application control may be performed in accordance with the information recorded in a plurality of sheets of cards 20. At this time, the behavior DB 72 stores the behavior of the information processing apparatus 10 to the combination of a plurality of sheets of cards 20. Specifically, the behavior DB 72 stores combinations of a plurality of kind-of-card IDs, and processing for software associated with the combinations. In the case where a timing at which temporally continuous card recording information is acquired is within a predetermined time (for example, three seconds), the processing section 62 handles these pieces of recording information as a group of inputs, and refers to the storage contents of the behavior DB 72. Incidentally, in the case where in a state in which a plurality of sheets of cards 20 are stacked one upon another, the information reading/writing section 30 can read the recording information of the cards 20, the user has only to hold a plurality of sheets of cards 20 up the information reading/writing section 30. The behavior DB 72 sets special processing for the combinations of the cards 20, so that, for example, a plurality of applications can also be realized to cooperate with one another.

In addition, in the embodiment, the NFC card is used as the card 20. In a modified changes, although it may be impossible to write the data, a card in which a two-dimensional code or a one-dimensional code such as a QR code (registered trademark) or a bar code is recorded may also be used.

REFERENCE SIGNS LIST

1 . . . Information processing system, 4 . . . Management server, 10 . . . Information processing apparatus, 20 . . . Card, 30 . . . Information reading/writing section, 60 . . . Information acquiring section, 62 . . . Processing section, 64 . . . Execution section, 66 . . . Application, 66a . . . Game, 66b . . . Chat, 68 . . . Display processing section, 70 . . . Storage section, 72 . . . Behavior DB, 74 . . . Program storing section, 80 . . . Manipulation data acquiring section.

INDUSTRIAL APPLICABILITY

The present invention can be utilized in a technology for processing software by using information recorded in a recording medium such as a card.

The invention claimed is:
1. An information processing apparatus, comprising:
a data reading circuit configured to, when a recording medium is adjacent the apparatus in a reading position in which the recording medium can be read by the apparatus, acquire kind identification data recorded in the recording medium, the recording medium being one of a plurality of recording media, each recording medium of the plurality of recording media having recorded therein respective kind identification data different than kind identification data of each other recording medium of the plurality of recording media, each kind identification data identifying, and directing the information processing apparatus to engage in, a respective behavior of the information processing apparatus, such directing being limited to only the respective behavior, the behavior being one of a plurality of behaviors, each of the plurality of behaviors being different than the behavior associated with the other kind identification data;
a storage apparatus configured to store the kind identification data and software associated with the kind identification data; and
a processing circuit configured to, when the kind identification data is acquired by the data reading circuit, identify the software associated with the kind identification data by referring to a database of the storage apparatus in which the software and the kind identification data are associated; wherein:
the plurality of behaviors includes two or more of friend registration, game activation, browser activation, function setting, item purchasing, and configuration setting,
the data reading circuit acquires a medium number peculiar to a recording medium together with the kind identification data,
the storage apparatus stores the kind identification data representing the recording media, and processing for transmitting user identification data over to invitation software with the kind identification data and the processing to be associated with each other in a situation in which a mode is not the identity registration mode and the medium number is registered as the medium number of the user, when the data reading circuit acquires the kind identification data representing the recording media, and the medium numbers in a situation in which the mode is not the identity registration mode, if the medium of interest is not registered as the medium number of the user, the processing circuit transmits the user identification data over to the invitation software, and the invitation software executes processing for inviting the user to an application being executed.

2. The information processing apparatus according to claim 1, wherein the storage apparatus stores the kind identification data, and processing for the software associated with the kind identification data; and the processing circuit executes the processing stored in the storage apparatus for the software.

3. The information processing apparatus according to claim 2, wherein the storage apparatus stores the kind identification data, and the processing for the software for each situation when the data reading circuit acquires the kind identification data; and the processing circuit executes the processing for the software in accordance with the situation when the data reading circuit acquires the kind identification data.

4. The information processing apparatus according to claim 1, wherein the storage apparatus stores the kind identification data representing recording media, and processing for transmitting the medium number to identity registration software with the kind identification data and the processing being associated with each other in a situation of an identity registration mode;

when the data reading circuit acquires the kind identification data representing the recording media, and the medium number in the identity registration mode, the processing circuit transmits the medium number to the identity registration software; and the identity registration software registers the medium number thus transmitted thereto as the medium number of a user in the storage apparatus, and transmits the medium number thus transmitted thereto to a management server for registering the medium number thus transmitted thereto as the medium number of the user.

5. The information processing apparatus according to claim 1, wherein the storage apparatus stores the kind identification data representing the recording media, and processing for transmitting the medium number to the identity registration software with the kind identification data and the processing being associated with each other in a situation in which a mode is not the identity registration mode and the medium number is not registered as the medium number of the user;

when the data reading circuit acquires the kind identification data representing the recording media, and the medium numbers in a situation in which the mode is not the identity registration mode, if the medium of interest is not registered as the medium number of the user, the processing circuit transmits the medium number to the identity registration software; and the identity registration software registers the medium number thus transmitted thereto as the medium number of the user in the storage apparatus, and transmits the medium number thus transmitted thereto to the management server for registering the user.

6. The information processing apparatus according to claim 1, wherein when the data reading circuit acquires the kind identification data including information with which content is specified, if the content to be specified is not downloaded, the processing circuit activates download software, and transmits the kind identification data associated with the content over to the download software, while if the content to be specified is downloaded, the processing circuit activates the content.

7. The information processing apparatus according to claim 1, wherein the storage apparatus stores a combination of a plurality of kind identification data, and processing for software associated with the combination.

8. The information processing apparatus according to claim 1, wherein the behavior identified by the kind identification data recorded in the recording medium is known to the respective user from an illustration on the recording medium.

9. A software processing method, comprising:

when a recording medium is adjacent an information processing apparatus in a reading position in which the recording medium can be read by the apparatus, acquiring kind identification data recorded in the recording medium, the recording medium being one of a plurality of recording media, each recording medium of the plurality of recording media having recorded therein respective kind identification data different than kind identification data of each other recording medium of the plurality of recording media, each kind identification data identifying, and directing the information processing apparatus to engage in, a respective behavior, of the information processing apparatus, such directing being limited to only the respective behavior, the behavior being one of a plurality of behaviors, each of the plurality of behaviors being different than the behavior associated with the other kind identification data; and specifying software associated with the acquired kind identification data by referring to storage contents of a storage apparatus storing kind identification data and software associated with the kind identification data; wherein:

the plurality of behaviors includes two or more of friend registration, game activation, browser activation, function setting, item purchasing, and configuration setting, the acquiring includes acquiring a medium number peculiar to a recording medium together with the kind identification data, the storage apparatus stores the kind identification data representing the recording media, and processing for transmitting user identification data over to invitation software with the kind identification data and the processing to be associated with each other in a situation in which a mode is not the identity registration mode and the medium number is registered as the medium number of the user, when the acquiring acquires the kind identification data representing the recording media, and the medium numbers in a situation in which the mode is not the identity registration mode, if the medium of interest is not registered as the medium number of the user, the specifying includes transmitting the user identification data over to the invitation software, and the invitation software executes processing for inviting the user to an application being executed.

10. A non-transitory, computer readable storage medium containing a computer program, which when executed by a computer, causes the computer to carry out actions, comprising:

when a recording medium is adjacent an information processing apparatus in a reading position in which the recording medium can be read by the apparatus, acquiring kind identification data recorded in the recording medium, the recording medium being one of a plurality of recording media, each recording medium of the plurality of recording media having recorded therein respective kind identification data different than the kind identification data of each other recording medium of the plurality of recording media, each kind identification data identifying, and directing the information processing apparatus to engage in, a respective behavior, of the information processing apparatus, such directing being limited to only the respective behavior, the behavior being one of a plurality of behaviors, each of the plurality of behaviors being different than the behavior associated with the other kind identification data; and specifying software associated with the acquired kind identification data by referring to storage contents of a storage apparatus storing kind identification data and software associated with the kind identification data; wherein:

the plurality of behaviors includes two or more of friend registration, game activation, browser activation, function setting, item purchasing, and configuration setting, the acquiring includes acquiring a medium number peculiar to a recording medium together with the kind identification data, the storage apparatus stores the kind identification data representing the recording media, and processing for transmitting user identification data over to invitation software with the kind identification data and the processing to be associated with each other in a situation in which a mode is not the identity registration mode and the medium number is registered as the medium number of the user, when the acquiring acquires the kind identification data representing the recording media, and the medium numbers in a situation in which the mode is not the identity registration mode, if the medium of interest is not registered as the medium number of the user, the specifying includes transmitting the user identification data over to the invitation software, and the invitation software executes processing for inviting the user to an application being executed.

* * * * *